United States Patent Office 3,250,353
Patented May 10, 1966

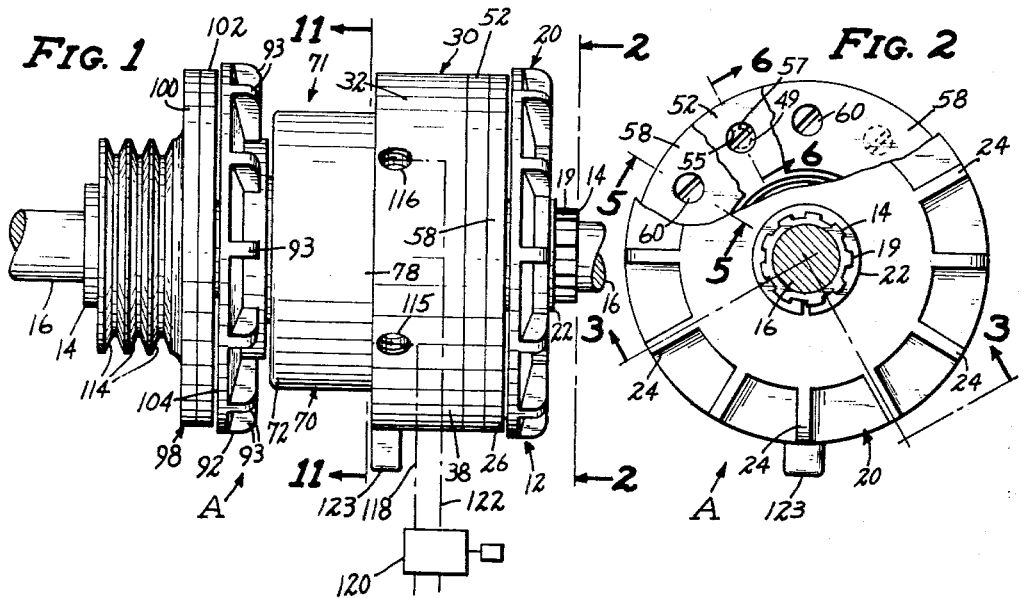
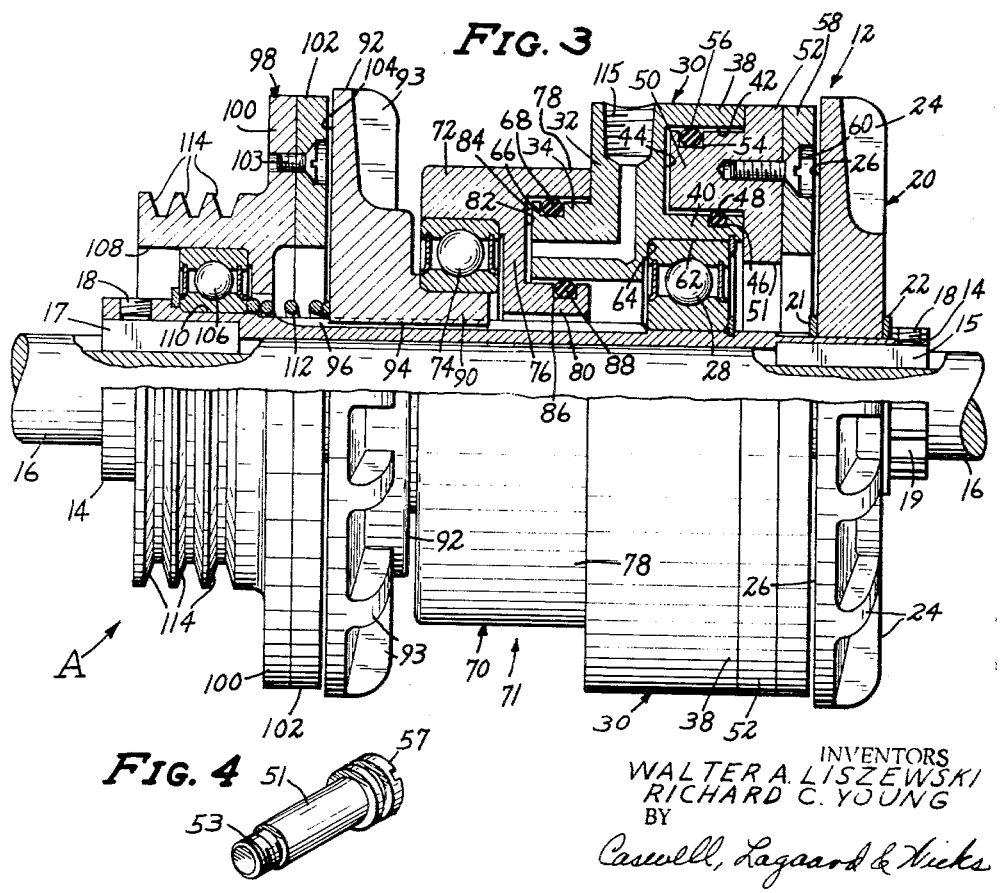

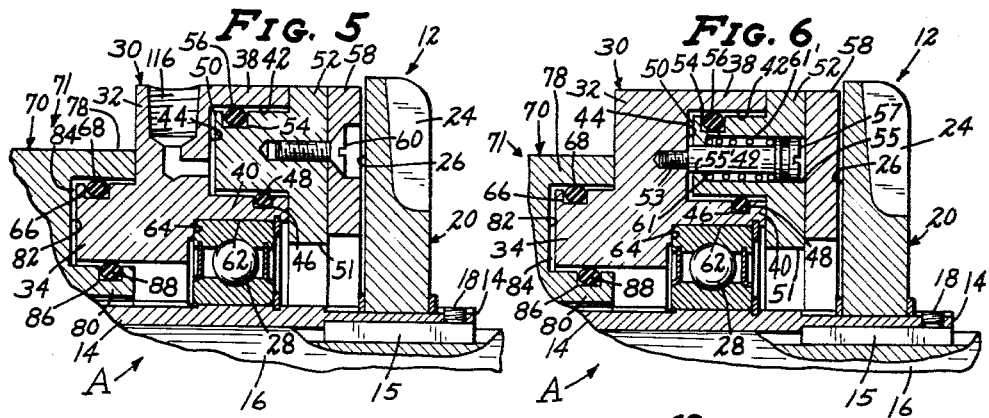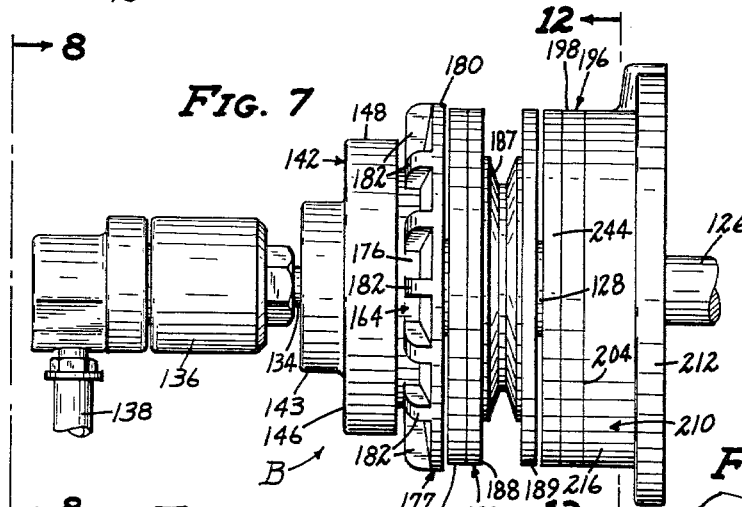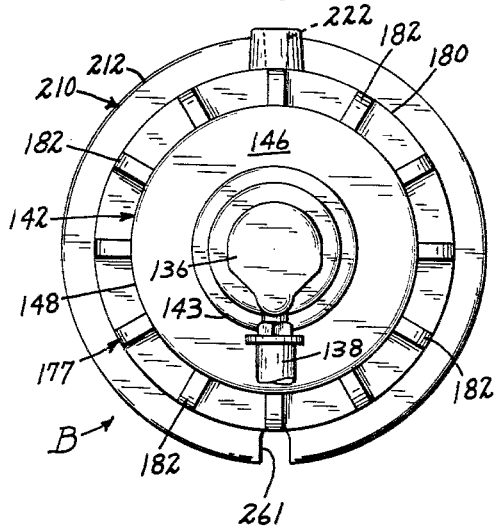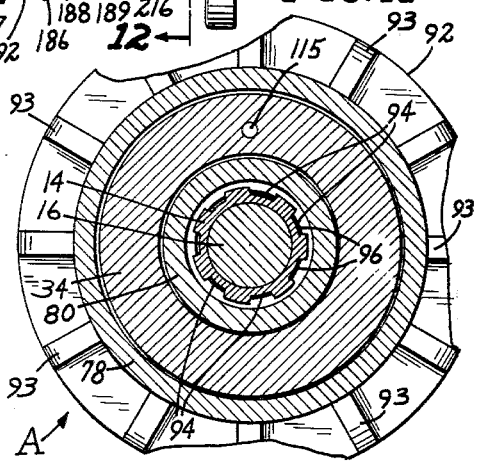

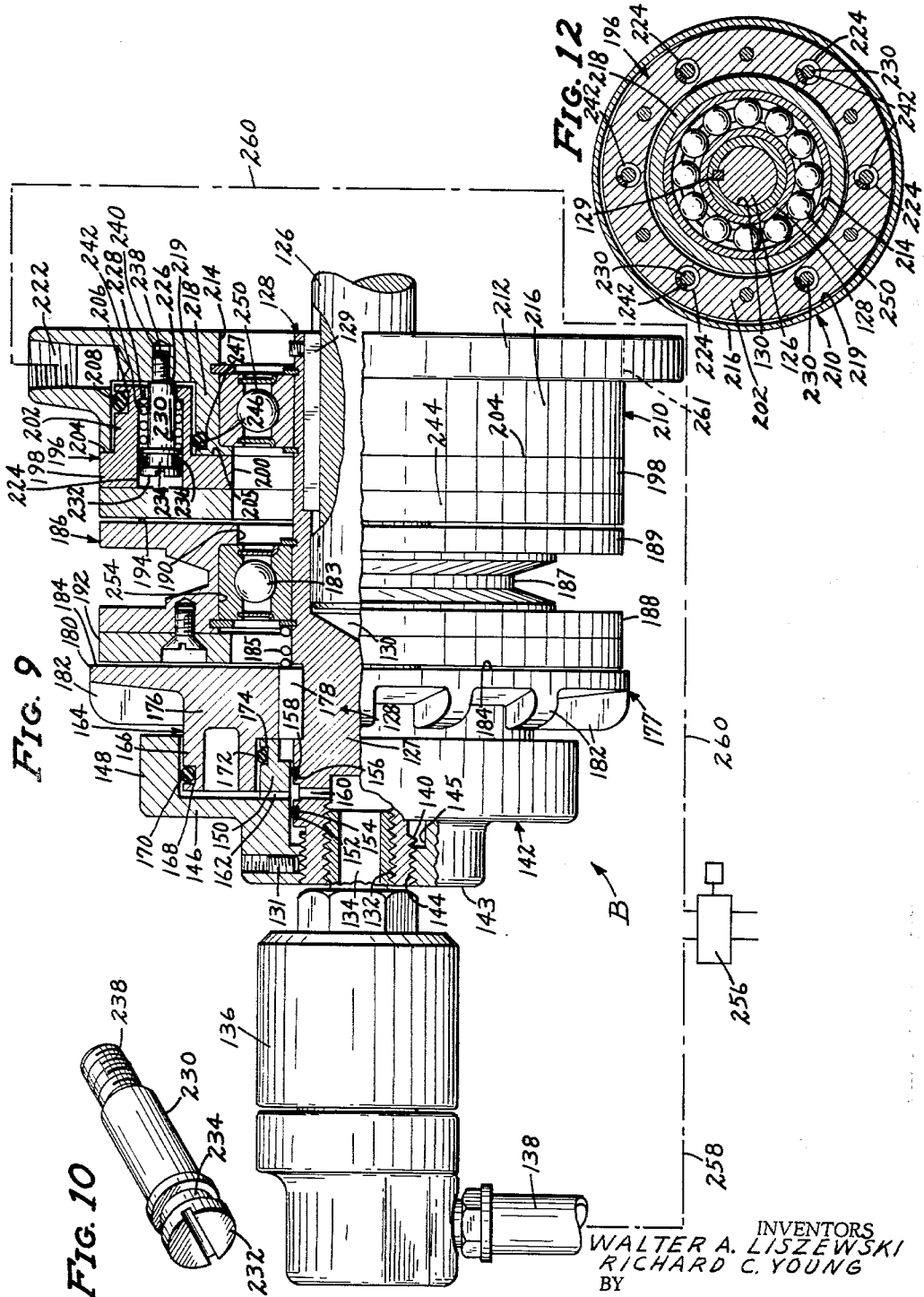

3,250,353
CLUTCH AND BRAKE WITH STATIONARY
FLUID MOTOR
Walter A. Liszewski, Minneapolis, and Richard C. Young, South St. Paul, Minn., assignors to Horton Manufacturing Co., Inc., Minneapolis, Minn.
Filed July 10, 1963, Ser. No. 294,027
2 Claims. (Cl. 192—18)

The invention relates to an improvement in a device for cycling the rotation of a shaft with a quick positive clutching thereof or a quick braking of the shaft as desired and in quick succession if desired.

It is an object of the invention to provide a device for cycling the rotation of a shaft including the selective stopping and starting of the shaft, the device being a single unit including a sheave mount.

It is a further object to provide the above device in which the means for starting and stopping the shaft are both mounted on the single shaft in a single compact unit and which is operated by fluid pressure.

It is also an object to provide a further embodiment of the above device which may be mounted on the end of a shaft.

It is a still further object to provide a clutch and brake device having a new and novel clutch piston and brake cylinder formation which also mounts both the clutch fluid pressure inlet and the brake fluid pressure inlet.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevational view of the clutch-brake device according to the invention.

FIGURE 2 is a sectional view on the line 2—2 of FIGURE 1.

FIGURE 3 is a sectional view of the clutch-brake on the line 3—3 of FIGURE 2.

FIGURE 4 is a perspective view of the shoulder bolt removed from the braking portion of the device.

FIGURE 5 is a sectional view on the line 5—5 of FIGURE 2.

FIGURE 6 is a sectional view on the line 6—6 of FIGURE 2.

FIGURE 7 is a side elevational view of a modification of the clutch-brake.

FIGURE 8 is an end view of the modification shown in FIGURE 7 on the line 8—8 of FIGURE 7.

FIGURE 9 is a longitudinal sectional view of the modification of FIGURE 7 parts of which are in full line and parts of which are broken away.

FIGURE 10 is a perspective view of a shoulder bolt removed from the brake section of the unit.

FIGURE 11 is a sectional view on the line 11—11 of FIGURE 1.

FIGURE 12 is a sectional view on the line 12—12 of FIGURE 7.

Referring to the drawings in detail, the clutch-brake unit A includes the brake section 12 and included in said section is the hub 14 which is bored out to receive shaft 16. The hub 14 is keyed to the shaft 16 by keys 15 and 17 and secured by means of the set screws 18. The numeral 20 designates a brake disc which is secured upon the hub 14 against rotation by the splines 19 and secured against axial movement by the lock rings 21 and 22. The brake disc 20 has formed on the outer face thereof the radially extending cooling fins 24, and the inner flat radial surface 26 thereof in the braking surface.

Further provided is the anti-friction bearing 28, the inner race of which is press fit on the hub 14. The numeral 30 designates a combination clutch piston and brake cylinder member positioned somewhat centrally of the unit A and which is formed of the substantially central annular body portion 32 and extending from the central body portion 32 is the concentric annular clutch piston 34. Also extending from the central annular body portion 32 in opposed relation to the clutch piston 34 is the outer annular cylinder flange 38 and the inner annular cylinder flange 40 concentric therewith and axially of the hub 14 which flanges 38 and 40 form the annular brake cylinder 42 with the radial wall portion 44 which wall is normal to the longitudinal axis of the hub 14 and forms the head of the brake cylinder. The inner cylinder flange 40 is formed with an annular recess 46 which receives the O-ring 48, which maintains sealing contact between cylinder flange 40 and annular brake piston 50.

The annular piston 50 extends from and is integral with the annular piston base portion 52, the annular base 52 formed with axial opening 51. The annular piston 50 has formed on the outer periphery thereof the recess 54 in which is positioned the O-ring 56 which maintains sealing contact between the outer flange wall 38 of cylinder 42 and piston 50. The annular piston base portion 52 has secured thereto the annular friction facing 58 by means of the bolts 60. It will be seen that the bearing 28 carries the clutch piston and brake cylinder member 30, the member 30 also mounting the brake piston 50 and the clutch cylinder 34.

The annular piston 50 is mounted on a multiplicity of spaced shoulder bolts 49 which are anchored at the reduced inner ends 53 thereof in the annular body portion 32, FIGURES 2, 4 and 6. Each of the bolts 49 extend into and through a hole 55 extending through the piston 50 and the piston base portion 52, the hole 55 reduced at 55' to form shoulder 61. Interposed between the head 57 of the bolt 49 and the inner shoulder 61 of the hole 55 is the coil spring 61' which normally urges the annular brake piston 50 inwardly of the cylinder 42 thereby normally spacing the friction facing 58 from the braking surface 26 of the brake disc 20.

The outer race of the bearing 28 is press fit in the annular recess 62 formed by the inner surface of the inner cylinder flange 40, and the bearing 28 abuts the wall portion 64 of the central body portion 32. The bearing 28 allows the shaft 16 to rotate within the brake cylinder 42 and the entire unit A.

Formed on the outer surface of the clutch piston 34 is the annular recess 66 which receives the O-ring 68. The numeral 70 designates the clutch cylinder body which is part of the clutch section 71, and it includes the annular body portion 72 within which is press fit the outer race of the thrust bearing 74. Formed as part of and extending from the body portion 72 is the radial wall portion 76, the inner edge of which is spaced from the hub 14. The radial wall 76 terminates at its outer edge in the right angularly disposed outer annular clutch cylinder flange 78 and at its inner edge in the right angularly disposed inner annular clutch cylinder flange 80. The inner and outer flanges 80 and 78, respectively, together with the radial headwall surface 82 of the radial wall 76 form the annular clutch cylinder 84. The inner annular flange 80 of the clutch cylinder is formed with the annular recess 86 which receives the O-ring 88 to make sealing contact between the inner surface of clutch piston 34 and clutch cylinder flange portion 80.

The inner race of the bearing 74 is press fit upon the annular flange portion 90 of the friction disc clutch member 92 which is slidable axially on the hub 14 by means of a series of spaced splines 94 mounted in slots 96 extending longitudinally of the hub 14. It will thus be seen that the clutch disc member 92 carries the clutch cylinder body 70 by means of bearing 74 and that the cylinder body 70 is slidable axially on the hub 14 with the slidable clutch disc 92. The clutch disc member 92 is formed with the cooling fins 93.

The annular friction disc mount 98 includes the radially disposed flange portion 100 which mounts the clutch friction facing 102 by means of bolts 103 which facing is directly opposed to the flat radial surface 104 of the clutch disc member 92.

A thrust bearing 106 is provided, the outer race of which is press fit within the annular recess 108 of the disc mount 98 and which abuts the flange portion 100 thereof. The inner race of bearing 106 is press fit upon the annular recess 110 formed on the hub 14. The disc clutch member 92 is normally urged from the friction facing 102 by means of the coiled spring 112 abutting the fixed bearing 106 and the disc member 92 and mounted on the hub 14. The friction disc mount 98 has formed in the outer periphery thereof V-grooves to form a sheave 114 for V-belts.

Extending into the annular body portion 32 of the combination clutch piston and brake cylinder member 30 is the clutch air inlet 115, FIGURES 1 and 3, which leads to and through the annular clutch piston 34 to clutch cylinder 84. The body portion 32 is also formed with the brake air inlet 116, FIGURES 1 and 5, which leads to the annular brake cylinder 42. Diagrammatically illustrated in connection with FIGURE 1 is a clutch air pressure line 118 connected to the clutch inlet 115 and to the conventional four-way two position valve illustrated by box 120. A brake air pressure line 122 is connected to the brake inlet 116 and the valve 120.

When valve 120 is actuated, air is introduced into the clutch air inlet 115 to thereby move clutch cylinder body 70 and rotating disc clutch member 92 abutting the same to engage the clutch surface 104 with friction facing 102 against the action of spring 112 and thereby rotate shaft 16 by means of sheave 114 which is rotated by V-belts and a source of power not shown. The valve 120 is then actuated so that air pressure to the clutch inlet 115 is exhausted via line 118 whereby pressure is relieved in cylinder 84 causing clutch disc surface 104 to move out of contact with friction facing 102 and thereby declutch shaft 16. Sheave 114 continues to rotate as a driver. With said actuation of valve 120 exhausting air from the clutch cylinder 84 air pressure is simultaneously introduced into brake inlet 116 via line 122 leading to brake cylinder 42 whereby the annular brake piston 50 is moved to cause the brake friction facing 58 to engage the braking surface 26 of brake disc 20 and thereby brake the shaft 16, for the brake disc 20 is secured to the shaft 16 as heretofore set forth. The member 30 is held against rotation by means of the radially extending dog 123 engaged with a fixed member not shown. Thus it can be seen that as a result of the construction herein set forth the shaft 16 can be clutched and then declutched and the shaft 16 virtually simultaneously braked. In the above described operation the shaft 16 is the driven element and the sheave 114 the driver element.

In the disclosure in FIGURES 1–6 and FIGURE 11 the unit A is mounted on a shaft intermediate its ends. In FIGURES 7–10 and FIGURE 12 is shown a modification of the unit indicated as B which is mountable on the end of a shaft such as 126. The numeral 128 designates a main hub which is formed with the hollow portion 130 which recieves the end of shaft 126. The solid end 127 of the hub 128 is formed with the axial threaded hole 132 which receives the hollow threaded end 134 of the conventional rotary air union 136 connected to the air supply line 138. The hub 128 is secured to the shaft 126 by means of the key 129.

The inner solid end of the main hub 128 is threaded as at 140 on which the clutch annular cylinder 142 is threadedly mounted by means of the hub portion 143 threaded at 144. The hub portion 143 is also formed with the axial opening 145 through which the inner end of hub 128 extends. The cylinder 142 is secured to hub 128 by the screws 131 extending through hub 143 and engaging hub 128. Extending radially from the hub portion 143 and as part of clutch cylinder 142 is the annular radial rim portion 146 which forms the cylinder head. Extending from the outer edge of the radial rim portion 146 at a right angle thereto and as part of the clutch cylinder 142 is the outer annular flange portion 148 which forms the outer wall of the cylinder 142. Extending from the inner edge of the rim portion 146 is the inner annular flange portion 150 forming the inner wall of the clutch annular cylinder 142. In other words, the annular cylinder 142 includes the rim or head portion 146 and extends between the outer annular flange 148 and the inner annular flange 150. The axial opening 145 of hub portion 143 extends through and defines the inner surface of flange 150.

The inner end of the main hub 128 is formed with a small annular recess 152 in which is positioned the O-ring 154 which makes sealing contact between the surface of axial opening 145 and the inner end of hub 128. The inner end of hub 128 is also formed with a small annular recess 156 in which is positioned the O-ring 158 which makes sealing contact between axial opening 145 and hub 128. Extending through the hub 128 from the threaded axial hole 132 and between O-rings 154 and 158 is the air passageway 160, and from a point opposite the passageway 160 and extending through the annular flange 150 of the cylinder hub is the air passageway 162 leading to a point inside of the cylinder 142. It will be seen that the air passageways 160 and 162 connect at a point between the O-rings 154 and 158 and as a result air cannot escape from the passageways along the hub 128.

The numeral 164 designates the clutch piston member which includes the annular piston body portion 166 which is positioned in the annular cylinder 142. Formed on the outer annular surface of annular piston 166 is the recess 168 which mounts the O-ring 170 to provide sealing engagement between the outer surface of the piston 166 and the outer wall flange portion 148 of the cylinder 142.

To provide sealing engagement between the inner wall of the annular piston 166 and the outer surface of the annular flange portion 150 forming the inner wall of the clutch cylinder 142 is the O-ring 172 positioned in the annular recess 174 formed in the piston portion 150. Formed as part of the annular clutch piston 166 is the axial piston base portion 176 which is secured to the hub 128 by means of the key 178 and as a result the piston 166 and cylinder 142 rotate with shaft 126. Extending from the piston base portion 176 is the radially extending flange portion 180 from which extends the spaced cooling fins 182. The piston base portion 176 and flange portion 180 blend to form the friction clutch member 177 having radial clutch surface 184. The clutch surface 184 is normally maintained spaced from friction facing 192 by means of coil spring 185 interposed between piston base portion 176 and bearing 183.

Further provided is the sheave 186 with the V-belt groove 187 and including the disc-like body portions 188 and 189 formed with the axial opening 190. Secured to the body portion 188 of the sheave 186 is the friction facing 192 which is engageable with the clutch surface 184 as hereinafter described. The body portion 189 of the sheave 186 is formed with the radial braking surface 194.

Also provided is the brake piston member 196 which includes the circular base portion 198 formed with the axial hole 200. Extending from the circular base portion 198 is the annular brake piston 202 which is spaced radially from the outer edge of the base 198 thereby providing the annular shoulder 204. The annular piston 202 is also spaced radially from the edge of the axial hole 200 to form shoulder 205 and has formed on the outer periphery thereof the recess 206 which mounts the O-ring 208.

The numeral 210 designates the annular brake cylinder which includes the annular base body portion 212 formed with the axial hole 214. Extending from the annular base portion 212 is the outer annular flange portion 216 and the inner annular flange portion 218, and these two annular flanges 216 and 218 together with the annular base portion 212 make up the annular brake cylinder recess 219 of the brake cylinder 210. The inner surface 220 of the base portion 212 forms the top of the annular brake cylinder 210. The annular brake cylinder base portion 212 is formed with the air inlet 222 which intersects the interior brake cylinder 210 whereby air under pressure may be introduced into the brake cylinder.

The annular brake piston 202 has a multiplicity of radially spaced holes 224 extending from the base 198 thereinto with a reduced hole portion 226 at the outer end of the piston which forms a small shoulder 228 internally of the hole 224. Positioned in each of the holes 224 is a shoulder bolt 230 identical to shoulder bolt 51 and which is formed with the head 232 having the annular recess 234 in which is mounted the O-ring 236, the O-ring being in sealing contact with the surface of the hole 224. The shoulder bolt 230 has a threaded reduced forward end portion 238 which threadedly engages a threaded hole 240 formed in the cylinder base portion 212. It will be seen that the shoulder bolts 230 mount the annular brake piston 202 within the annular brake cylinder 210.

Mounted on each of the shoulder bolts 230 between the head 232 thereof and the shoulder 228 of hole 224 is a coil spring 242 which normally urges the brake piston 202 and friction facing 244 mounted on piston base portion 198 away from braking surface 194 of sheave 186.

Sealing contact between brake cylinder wall flange portion 218 and the inner annular surface of brake piston 202 is made by means of O-ring 246 positioned in annular recess 247 formed in the flange portion 218.

The annular brake cylinder 210 is mounted on the shaft 126 by means of the bearing 250 the inner race of which is press fit upon the hub 128 with the outer race thereof press fit within the annular flange 218 of the cylinder 210. Thus, the hub 128 and shaft 126 are free to rotate within the brake cylinder 210 and piston 202 which are stationary.

The hub 128 rotates within the rotatable sheave 186 by means of the bearing 183, the outer race of which is press fit within the annular recess 254 of sheave 186 with the inner race press fit upon the hub 128.

It will be seen that the driver element is the shaft 126 with the sheave 186 as the driven element.

In FIGURE 9 is diagrammatically illustrated the conventional fuor-way two position valve 256 from which the air line 258 leads to clutch inlet 138. Also leading from the valve 256 is the air line 260 which is connected to the brake inlet 222. The brake cylinder 210 is held against rotation by means of a fixed dog, not shown, engaging the recess 261 formed in flange 212.

Operation of unit B is as follows: Let it be assumed that shaft 126 is rotated by a source of power not shown. To rotate sheave 186 as a driven element valve 256 is actuated whereby air pressure is introduced into clutch cylinder 142 via line 258, air union 136, and passageways 160 and 162 whereby the clutch piston 164 is moved against the action of spring 185 thereby causing clutch surface 184 to engage friction facing 192 of sheave 186 and cause said sheave to rotate on its bearing 183. The sheave 186 may be quickly braked by further actuating the valve 256 which relieves the air pressure in line 258 thereby disengaging clutch surface 184 from friction facing 192. At the same time, the actuation of valve 256 allows air pressure to be introduced into brake cylinder 210 via line 260 and air inlet 222 whereby the brake piston 202 is moved against the action of the shoulder bolt springs 242 thereby causing friction facing 244 to engage radial braking surface 194 of sheave 186 and thereby brake the sheave.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A clutching and braking device comprising:
   (a) a shaft having
   (b) a sheave rotatably mounted thereon,
   (c) a clutch disc keyed to and axially slidable on said shaft for engagement with said sheave,
   (d) said clutch disc having an annular flange,
   (e) a first radial anti-friction thrust bearing mounted on said flange of said clutch disc,
   (f) an annular clutch cylinder mounted on said first bearing so as to allow said clutch disc to be rotatable with respect thereto,
   (g) an annular body member mounted around said shaft and having formed thereon
   (h) an annular clutch piston and
   (i) an annular brake cylinder formed therein axially opposed to said clutch piston,
   (j) said brake cylinder having a diameter sufficient to provide an annular recess in said annular body radially inwardly of said brake cylinder,
   (k) a second radial anti-friction end thrust bearing mounted in said annular recess and acting between said annular body and said shaft, to mount said shaft for rotation within said annular body,
   (l) said annular brake piston having friction facing means secured thereto,
   (m) a brake disc secured to said shaft for rotation therewith,
   (n) said annular body member having an air passageway leading to said annular clutch cylinder and
   (o) an air passageway leading to said brake cylinder,
   (p) means for introducing air under pressure to said clutch cylinder via said clutch air passageway to cause said clutch disc to engage said sheave to thereby rotate said shaft, and
   (q) means for introducing air under pressure to said brake cylinder via said brake air passageway to cause said friction facing means to said brake piston to engage said brake disc to thereby brake said shaft.

2. The device of claim 1 wherein
   (a) said annular recess of said annular body member is substantially axially coextensive with said brake cylinder and brake piston therein.

References Cited by the Examiner

UNITED STATES PATENTS

| 1,364,392 | 1/1921 | Macho. |
| 2,055,970 | 9/1936 | Fippard _____ 192—87 |
| 2,909,255 | 10/1959 | Chung. |
| 3,157,257 | 11/1964 | Root. |

FOREIGN PATENTS 956,237   7/1949   France.

DAVID J. WILLIAMOWSKY, *Primary Examiner.*

DON A. WAITE, *Examiner.*

B. W. WYCHE III, *Assistant Examiner.*